(12) United States Patent
Boucher et al.

(10) Patent No.: US 8,364,153 B2
(45) Date of Patent: Jan. 29, 2013

(54) MOBILE INTEROPERABILITY WORKSTATION CONTROLLER HAVING VIDEO CAPABILITIES WITHIN AN INCIDENT COMMUNICATIONS NETWORK

(75) Inventors: Joseph N. Boucher, Wallingford, CT (US); Paul Kurmas, Wallingford, CT (US)

(73) Assignee: Mutualink, Inc., Wallingford, CT (US)

( * ) Notice: Subject to any disclaimer, the term of this patent is extended or adjusted under 35 U.S.C. 154(b) by 87 days.

(21) Appl. No.: 12/856,383

(22) Filed: Aug. 13, 2010

(65) Prior Publication Data

US 2012/0040635 A1 Feb. 16, 2012

(51) Int. Cl.
*H04M 11/04* (2006.01)
(52) U.S. Cl. .................. 455/445; 455/404.1; 455/414.1; 455/404.2
(58) Field of Classification Search .................. 455/403, 455/404.1, 404.2, 466, 420, 435.1, 426.1, 455/426.2, 518, 519, 520, 521, 552.1, 554.1, 455/554.2, 555, 556.1, 445; 370/356, 328, 370/401, 329, 340, 341
See application file for complete search history.

(56) References Cited

U.S. PATENT DOCUMENTS

| | | | |
|---|---|---|---|
| 6,519,252 B2 * | 2/2003 | Sallberg | 370/356 |
| 6,859,448 B1 * | 2/2005 | Roy | 370/338 |
| 7,035,773 B2 * | 4/2006 | Keyes et al. | 702/188 |
| 7,076,249 B2 | 7/2006 | Svedevall et al. | |
| 7,453,837 B2 | 11/2008 | Jiang et al. | |
| 7,643,445 B2 | 1/2010 | Mills et al. | |
| 2002/0102999 A1 | 8/2002 | Maggenti et al. | |
| 2004/0125802 A1 | 7/2004 | Lillie et al. | |
| 2005/0079853 A1 | 4/2005 | Hurtta | |
| 2005/0170808 A1 * | 8/2005 | Hamilton | 455/404.1 |
| 2005/0250491 A1 * | 11/2005 | Roy | 455/428 |
| 2006/0023654 A1 | 2/2006 | Koren et al. | |
| 2006/0046697 A1 | 3/2006 | Koren et al. | |
| 2006/0052113 A1 * | 3/2006 | Ophir et al. | 455/456.1 |
| 2006/0158329 A1 | 7/2006 | Burkley et al. | |
| 2006/0182131 A1 * | 8/2006 | Dziekan, Jr. | 370/401 |
| 2007/0010275 A1 | 1/2007 | Kiss | |
| 2007/0060144 A1 | 3/2007 | Mills et al. | |
| 2008/0144525 A1 | 6/2008 | Crockett et al. | |
| 2010/0159976 A1 | 6/2010 | Marocchi et al. | |
| 2010/0261427 A1 | 10/2010 | Mills et al. | |

OTHER PUBLICATIONS

International Search Report and the Written Opinion of the International Searching Authority directed to related International Patent Application No. PCT/US2012/026062, mailed May 24, 2012, from the European Patent Office; 9 pages.

* cited by examiner

*Primary Examiner* — Jean Gelin
(74) *Attorney, Agent, or Firm* — Sterne, Kessler, Goldstein & Fox, PLLC

(57) ABSTRACT

The present invention is directed to a mobile interoperability workstation (IWS) controller with capabilities for controlling designated communications resources under its command and having, inter alia, inbound receiving and outbound sharing video capabilities, data file and data sending and receiving capabilities, text messaging capabilities and push to talk voice communications capabilities within an incident communications network. An incident communications network enables interoperable communications among communications resources controlled by multiple organizations during an incident involving emergency or pre-planned multi-organization communications. The incident communications network includes IWS controllers to control communications resources and enable a user a means to control and interface with the incident communications network. In the present invention, a mobile IWS supported by an IWS gateway are provided. In embodiments, the mobile IWS supports enhanced video capture and streaming capabilities that are integrated with incident management information and events associated with activities taking place on an incident communications network.

22 Claims, 9 Drawing Sheets

MOBILE INTEROPERABILITY WORKSTATION CONTROLLER HAVING VIDEO CAPABILITIES WITHIN AN INCIDENT COMMUNICATIONS NETWORK

BACKGROUND OF THE INVENTION

1. Field of the Invention

The present invention generally relates to a communications system for use by multiple agencies during an emergency or other incident, and more particularly, to an interoperable communications system for coupling separate communications resources to a common network wherein the connection for each communications resource with the common network is separately controlled by a controller associated with each radio network.

2. Background of the Invention

Private wireless communication networks, such as those used by public safety or commercial users, are typically isolated from one another and often utilize different and incompatible technologies. While interoperability products are available to interconnect such diverse systems, cooperation among the entities involved is often a barrier to full implementation. Thus, prior art first responder communication systems exist wherein control of the resources of each organization coupled to the system is controlled by a central commander or controller. Each organization providing resources to the system must relinquish control of its resources to the central commander. The organization responsible for the operation of its radio system(s) may be unable or unwilling to grant control of its resources either to peer organizations or to a higher-level organization.

U.S. Pat. No: 7,643,445, entitled Interoperable Communications System and Method of Use, issued on Jan. 5, 2010, which is herein incorporated by reference in its entirety, describes systems and methods for providing an interoperable communications system including a plurality of otherwise disjunct communications systems that addressed the deficiencies of prior art systems. The '445 patent specifically described a method for establishing an incident communications that enables interoperable communications among communications resources controlled by multiple organizations during an incident involving emergency or pre-planned multi-organization communications wherein a communications resource is controlled by an administrator within an organization. The incident communications network included interoperability workstations (IWSs) controllers to control communications resources and enable a user a means to control and interface with the incident communications network.

Based on the foregoing, it is the general object of the present invention to provide a mobile interoperability workstation controller having video capabilities within an incident communications network that improves upon, or overcomes the problems and drawbacks associated with prior art communication systems.

BRIEF SUMMARY OF THE INVENTION

The present invention provides a mobile interoperability workstation (IWS) controller with capabilities for controlling designated communications resources under its command and having, inter alia, inbound receiving and outbound sharing video capabilities, data file and data sending and receiving capabilities, text messaging capabilities and push to talk voice communications capabilities within an incident communications network, referred to generally as an interop system. The mobile IWS interoperates and communicates as an IWS and/or serves as a communications resource under the control or command of one or more other IWSs within an interoperable communications system comprised of a plurality of otherwise disjunct communications systems and/or agencies or participants.

An incident communications network enables interoperable communications among communications resources controlled by multiple organizations during an incident involving emergency or pre-planned multi-organization communications in which a communications resource is controlled by an administrator within an organization. The incident communications network includes IWS controllers to control communications resources and enable a user a means to control and interface with the incident communications network. In the present invention, a mobile IWS supported by an IWS gateway are provided. Furthermore, the mobile IWS and IWS gateway support enhanced video capture and streaming capabilities that are integrated with incident information and events to facilitate improved management and analysis of incidents or events in which an incident communications network is employed.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
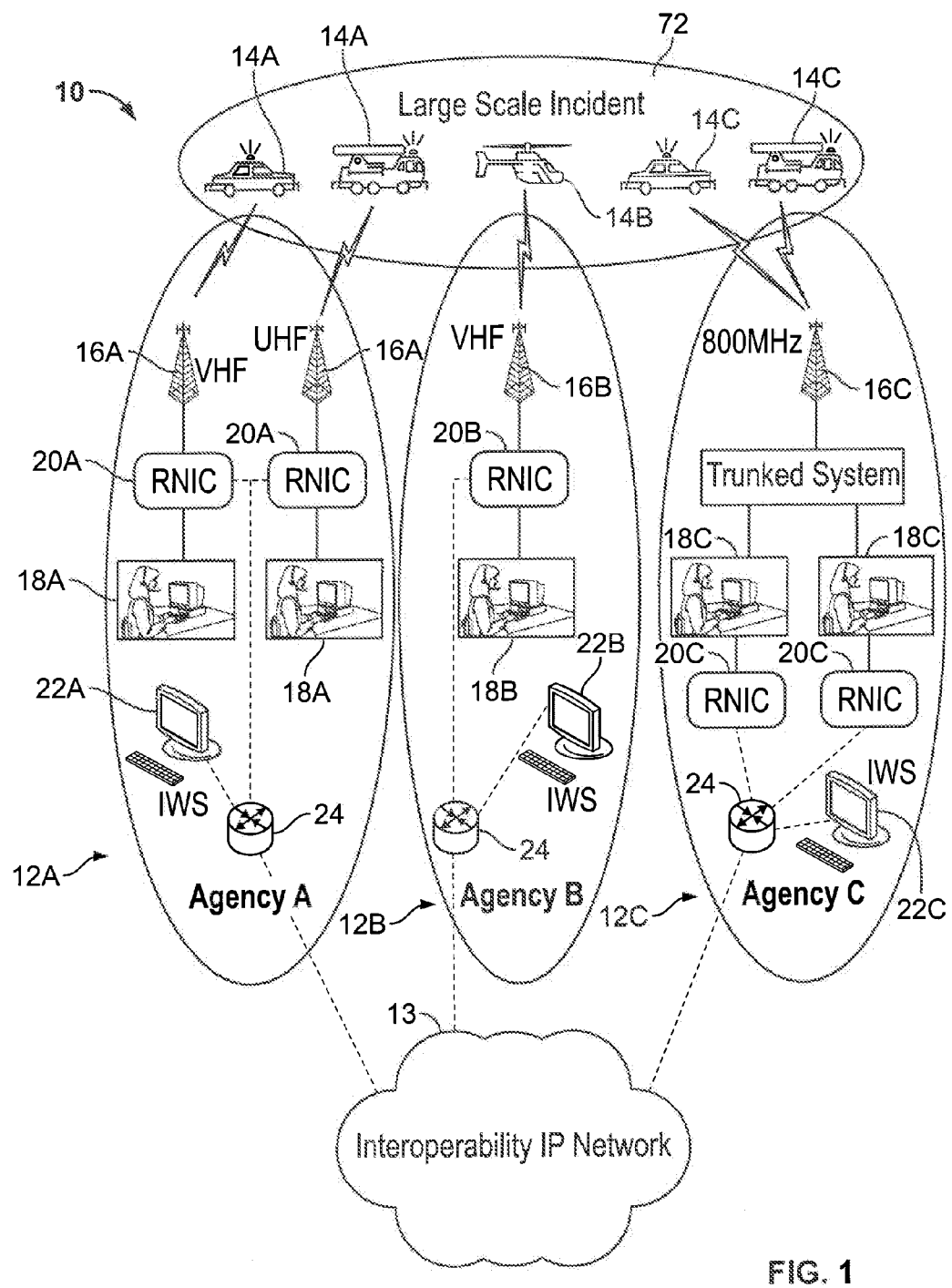
FIG. 1 is a block diagram showing an overview of one embodiment of an interoperable communications network in accordance the present invention.

As shown in FIG. 1, the present invention is directed to an interoperable communications system, hereinafter referred to as "Interop System" or an "Incident Communications Network" generally referred to by the reference numeral 10, which provides for communication between a plurality of separate radio networks 12, and/or other types of networks, such as telecommunication networks, video networks and data networks, which are not shown. In the FIG. 1 embodiment, the Interop System 10 includes the separate radio networks 12A, 12B and 12C each coupled to a common network 13 referred to as an Interoperability IP Network or hereinafter as the "Interop Network". Each radio network 12A-12C includes corresponding communication devices 14A-14C respectively, which include mobile communication devices 14A-14C mounted in various vehicles. Although not shown, hand-held or other types of portable communications devices 14 are also often utilized in the radio networks 12. As described following, users of the communication devices 14A-14C of each radio network 12A-12C respectively can communicate to all other users of each of the radio networks 12A-12C via the Interop Network 13 in accordance with the present invention.

Each of the radio networks 12A-12C also includes typical antennas 16A-16C and base consoles 18A-18C. The radio networks 12A-12C represent typical radio networks utilizing one of various communications channels including Very High Frequency (VHF), and Ultra High Frequency (UHF), among others, which are coupled together forming the Interop System 10 in accordance with the present invention. For example, FIG. 1 includes diagrams of various typical radio networks 12 including a two-channel system 12A, a single channel system 12B, and a trunked system 12C which are each coupled to the Interop Network 13 and together form the Interop System 10 in accordance with the present invention.

Still referring to FIG. 1, the Interop System 10 includes at least one radio network interface controller 20A-20C (herein referred to as "RNIC") coupled to each of the radio networks 12A-12C respectively. Each RNIC 20A-20C is coupled to the corresponding radio network 12 as well as the common Interop Network 13 and a controller 22 identified herein as an Interoperability Work Station (IWS). Each RNIC 20 is operable in response to commands from one or more IWS controllers 22 designated as having control over the particular RNIC 20 for coupling an associated radio network 12 to the Interop Network 13 for the purpose of transmitting and receiving messages to/from each of the other radio networks coupled to the Interop Network. The two-channel radio network 12A includes two interfaces RNIC 20A one for coupling each channel of the two-channel radio network to the Interop Network 13. Still referring to the radio network 12A, each of the two RNIC 20A interfaces are coupled to and controlled by a single IWS controller 22. However, in other embodiments of the present invention, other configurations may be utilized including wherein a single RNIC 20 is configured to connect both channels of a two-channel network to the Interop Network 13 or wherein each RNIC 20A is coupled to controllable by individual IWS controllers 22.

Still referring to FIG. 1, the Interop System 10 includes a router 24 coupled between the Interop Network 13 and the RNICS 20 and IWS controllers 22 for each radio network 12 for routing messages transmitted within the Interop Network 13. Alternatively, in other embodiments of the Interop System 10, other types of data switches or hubs may also be utilized instead of the data router 24.

In a preferred embodiment, the Interop System 10 transmits messages between the multiple radio networks 12 via IP protocol over the Interop Network 13, however, the scope of the present invention is not limited in this regard as any suitable transmission protocols and corresponding network could be utilized.

Figure 2:
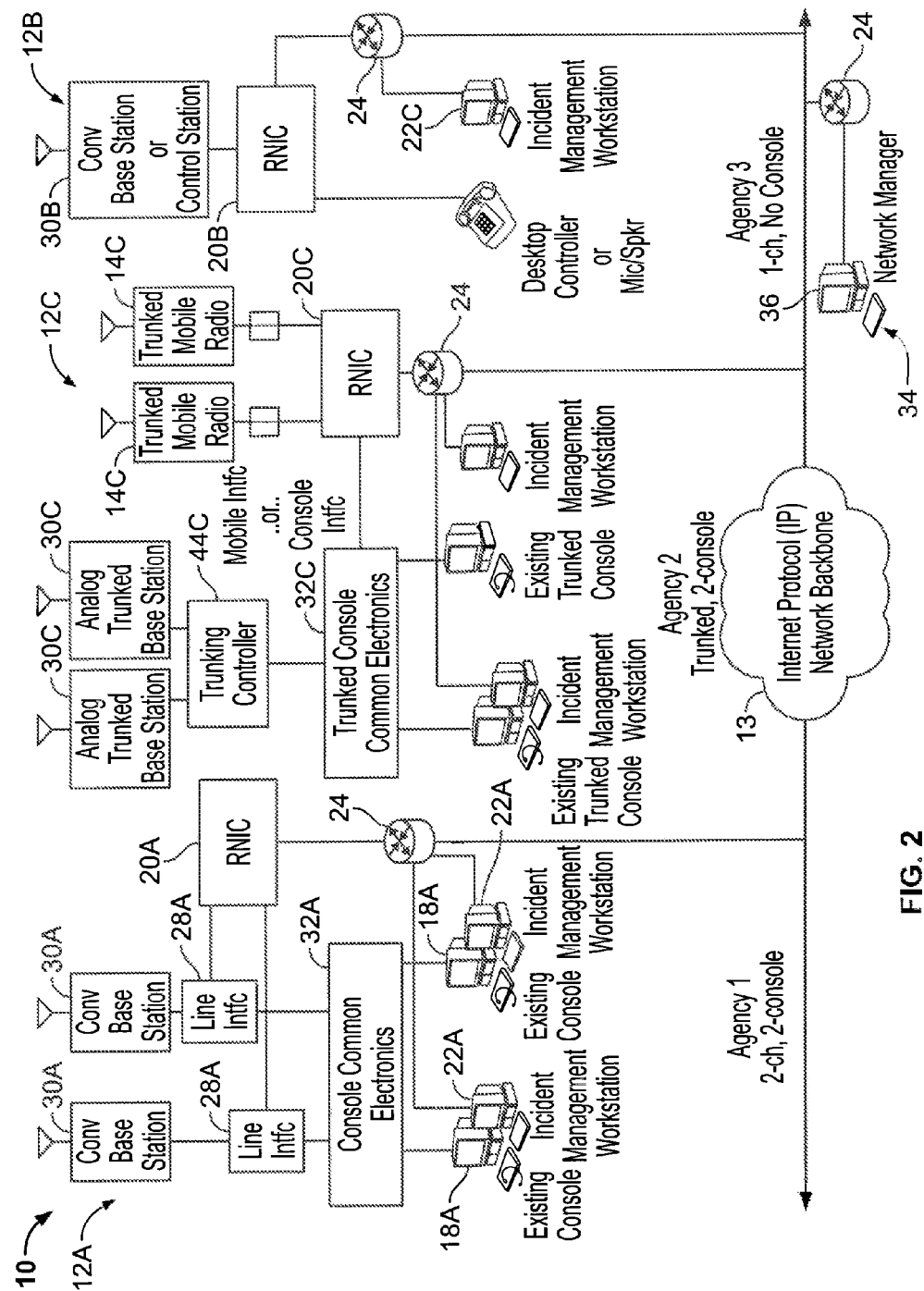
FIG. 2 is a block diagram showing another embodiment of an interoperable communications network in accordance with the present invention.

Preferably, the present invention Interop System 10 is configured as overlay architecture connectable to pre-existing radio networks 12A-12C as shown in FIG. 2. Typically, an RNIC 20 and IWS controller 22 is coupled to each existing radio network 12A-12C for connecting each radio network to the common Interop Network 13. In this embodiment, the existing radio networks 12A-12C are usually left in place for normal operation apart from the Interop System 10. Depending on the radio network 12 being coupled to the Interop Network 13, various types of line interfaces 28 are utilized for coupling the RNIC 20 to the particular radio network.

As shown in FIG. 2, the radio network 12A includes conventional base stations 30 or repeaters connected to base consoles 18A via conventional console electronics 32A. A line interface 28A is provided for coupling the RNIC 20A to the radio network 12A. Depending on the configuration of the radio network 12, the line interface 28 may include various known interfaces such as, local control interfaces (audio, push-to-talk (PTT), receiving indication), DC remote, tone remote, and ear and mouth (E & M) interfaces.

Alternatively, the RNIC 20C is connected to a trunked radio network 12C via an air interface 40C coupled to mobile radios 42C. In another embodiment, also illustrated in FIG. 2, the RNIC 20C can be coupled to the radio network 12C via typical console electronics 32C and trunking controller 44C.

Still referring to FIG. 2, the radio network 12B is coupled to the Interop Network 13 via the RNIC 20B coupled in-line in the existing radio network. Thus, the communications devices 14B are provided selective access to the Interop Network 13 via the RNIC 20B pursuant to commands from the IWS controller 22B associated with the radio network 12B or another authorized IWS controller 22.

Referring again to FIG. 2, a network administrator or manager 34 including a network server 36 may be coupled to the Interop Network 13 for carrying out administrative duties related to the Interop Network. Alternatively, in other embodiments of the Interop System 10, configuration of the network can be implemented from endpoints such as the IWS controllers 22 and RNIC 20 servers wherein a network administrative server is not required.

Figure 3:
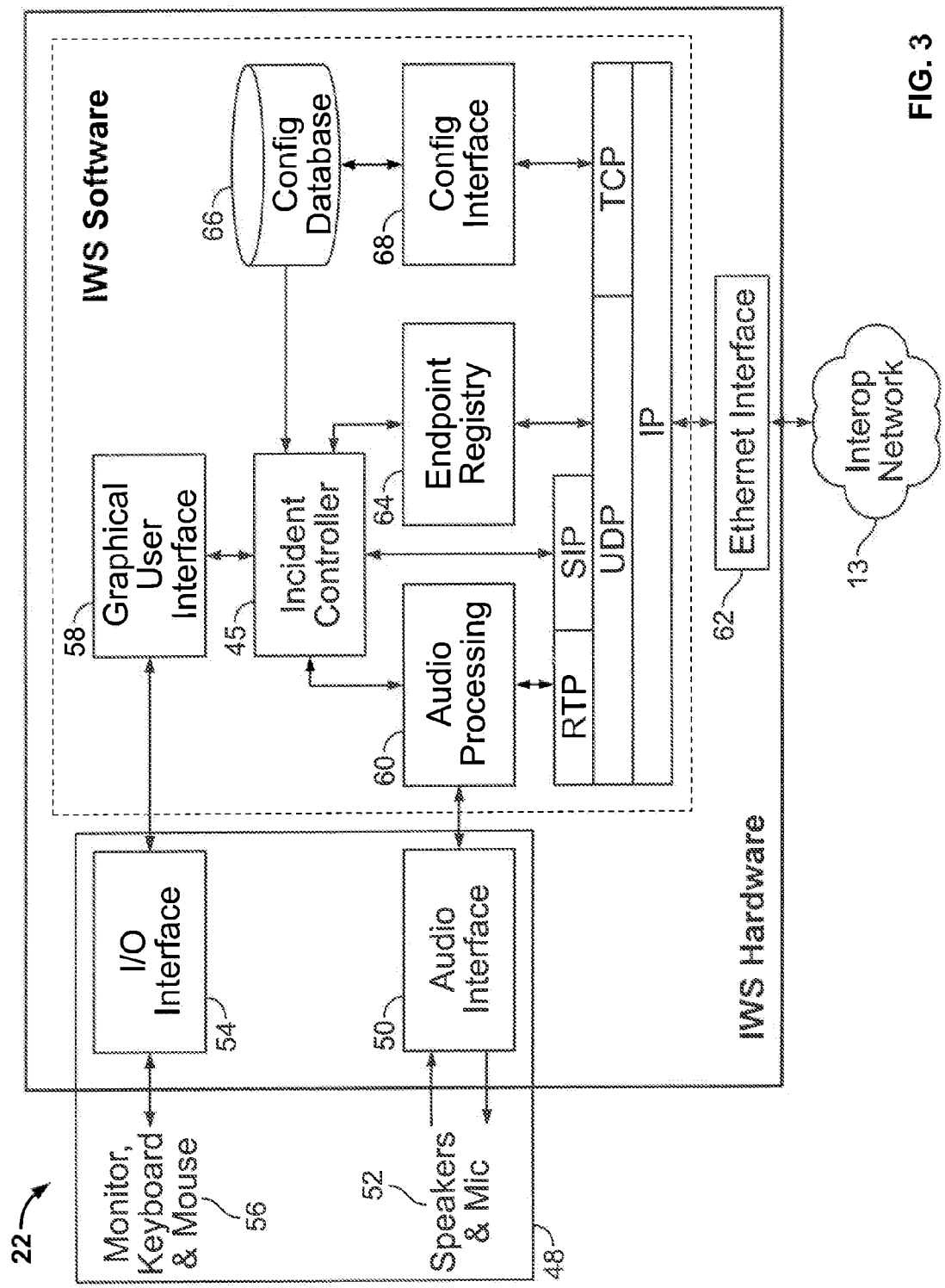
FIG. 3 is a block diagram of one embodiment of an Interoperability Workstation (IWS) controller in accordance with the present invention.

Referring now to FIGS. 1 and 3, each IWS controller 22 is coupled to the Interop Network 13 and the RNIC 20 for controlling the connection between the associated radio network 12 and the Interop Network 13. Thus, the connection between each radio network 12 and the Interop Network 13 is controlled by the IWS controller 22 associated with each radio network via the RNIC 20. This is a key feature of the present invention as control over each radio network 12 and the communication devices 14 associated therewith is maintained by an IWS controller 22 coupled thereto. As set shown in FIG. 3, the IWS controller 22 includes a computer processor identified as incident controller 45 having a user interface 48 including one or more of an audio interface 50 including a speaker and microphone 52 and an I/O interface 54 including a keyboard, mouse, monitor, joystick, etc., collectively, identified by the reference numeral 56. A graphical user interface (GUI) 58 is provided coupled to the I/O interface 54 for providing graphics based outputs to a user of the IWS controller 22 such as the GUI included in FIG. 6.

The IWS controller 22 includes an audio processor 60 coupled to the incident controller 45 and the audio interface 50 for processing audio inputs/outputs transmitted to and from the IWS controller respectively. The audio processor 60 converts data packets received by the IWS controller 22 to audio signals and outputs the same to a user of the IWS controller via the audio interface 50. Similarly, audio signals input to the IWS controller are converted by the audio processor 60 and/or the incident controller 45 and transmitted to the appropriate recipient via a network interface 62 and the Interop Network 13. In the preferred embodiment, audio signals are transmitted over the Interop Network 13 using standard RTP or SRTP as appropriate for real time transmission of audio messages, however other protocols may be utilized.

The IWS controller 22 includes an endpoint registry 64 coupled to the incident controller 45 and the network interface 62 for storing address information for all endpoints in the Interop System 10 including all RNIC 20 servers and all IWS controllers 22. Each endpoint in the Interop Network 13 periodically announces its presence to all other endpoints in the Interop Network (the preferred embodiment uses LP multicast to perform this announcement). All other endpoints that receive this announcement add the originating endpoint to their endpoint registry 64. The endpoint registry 64 allows each endpoint to communicate directly with any other endpoint in the Interop Network 13 without the need for an intervening server.

The IWS controller 22 also includes a configuration database 66 and configuration interface 68 coupled to the incident server and the Interop Network 13. The configuration database 66 is provided for storing configuration data for the IWS controller 22 as well as other IWS controllers 22 and RNIC 20 servers including public key information for each RNIC 20 and IWS controller 22 in the Interop System 10. A preferred embodiment of the Interop System 10 utilizes a public key cryptography method for encrypting messages transferred over the Interop Network 13.

Each RNIC 20 is configured with a list of IWS controllers 22 that have permission to control the operation of that RNIC which are stored in the configuration database 66 coupled to the RNIC. For security purposes, each RNIC 20 verifies that a received message is from one a trusted IWS controller 22.

For message authentication, the preferred embodiment of the Interop System 10 uses public-key cryptography as follows: Each endpoint in the system (RNIC 20 or IWS controller 22) is assigned a private key and a public key in accordance with standard key generation techniques. The private key is stored only on the endpoint associated therewith. The public key is distributed to all other endpoints in the network via the configuration interface 68. Messages from an endpoint to other endpoints are encrypted using the originating endpoint's private key. Messages received by an endpoint are decoded using the originating endpoint's public key. If this decode process is successful, the message originator and contents are securely authenticated.

The Interop System 10 provides for multiple authorized IWS controllers 22 to control a particular RNIC 20 and thereby control connection between the associated communications devices 14 and the Interop Network 13. Typically, for use during incidences involving multiple municipalities or jurisdictions, or other events, resources including radio networks 12 and the associated communication devices 14 may be shared by multiple organizations including wherein several or all of the organizations may be permitted to exercise control over the shared resources. The Interop System 10 provides for multiple organizations to control shared radio networks 12 by designating each of the IWS controller 22 for each of the multiple organizations as authorized to control the RNIC 20 associated with the shared network. Thus, the RNIC 20 is configured to include all authorized IWS controllers 22 as authorized to provide instructions to the RNIC. Although the commands are sent to the RNIC 20 as session invitations, the RNIC is configured to accept all invitations from authorized IWS controllers 22.

Figure 4:
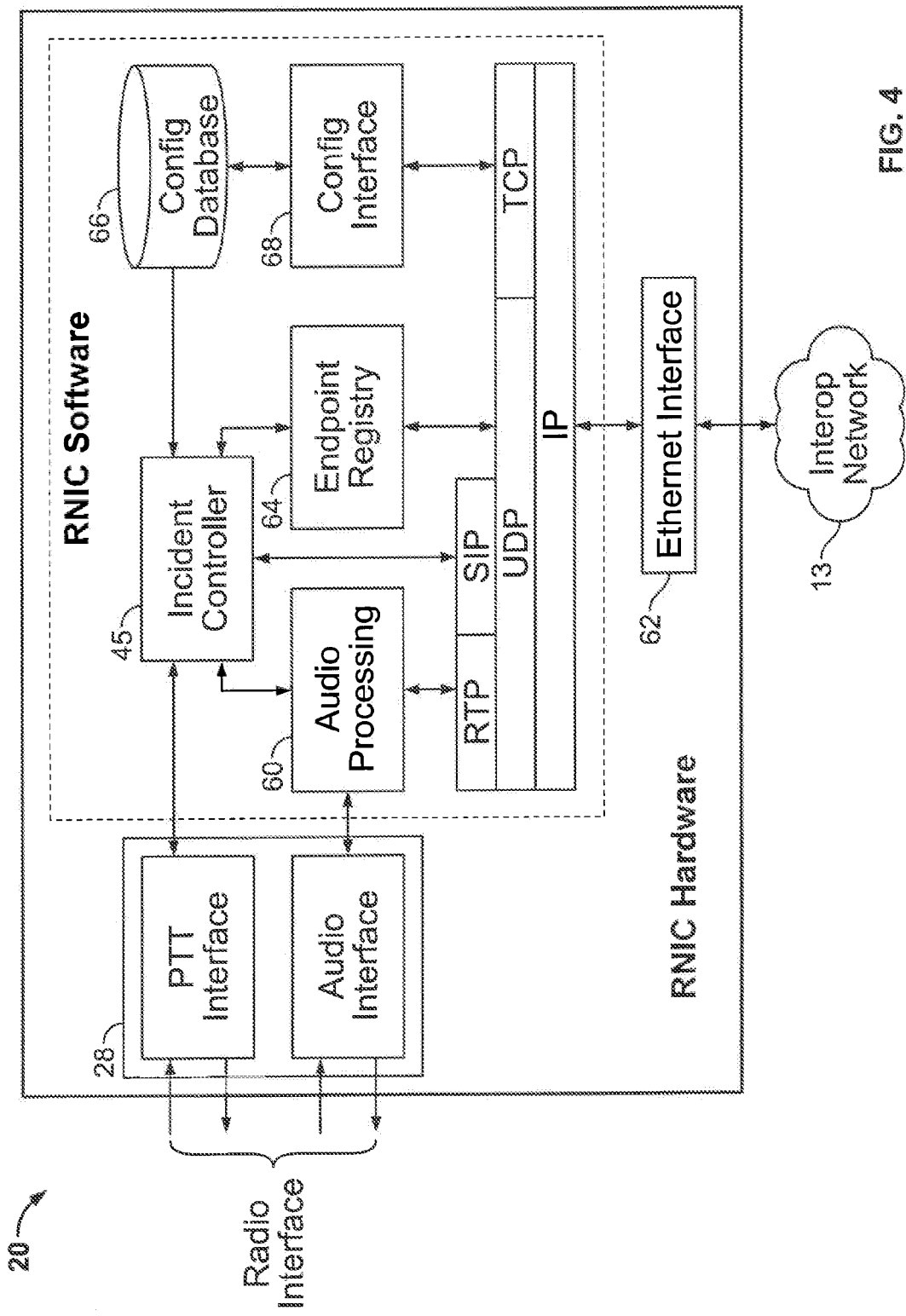
FIG. 4 is a block diagram of one embodiment of a Radio Network Interface Controller (RNIC) in accordance with the present invention.

Referring to FIG. 4, the RNIC 20 coupled to each radio network 12 includes an incident controller 45, coupled to an audio processor 60, an endpoint registry 64, a configuration database 66 and a configuration interface 68 as set forth above with respect to the IWS controller 22. The incident controller 45 is coupled to an associated radio network 12 via a radio interface 28 and the Interop Network 13 via a network interface 62.

Figure 5:
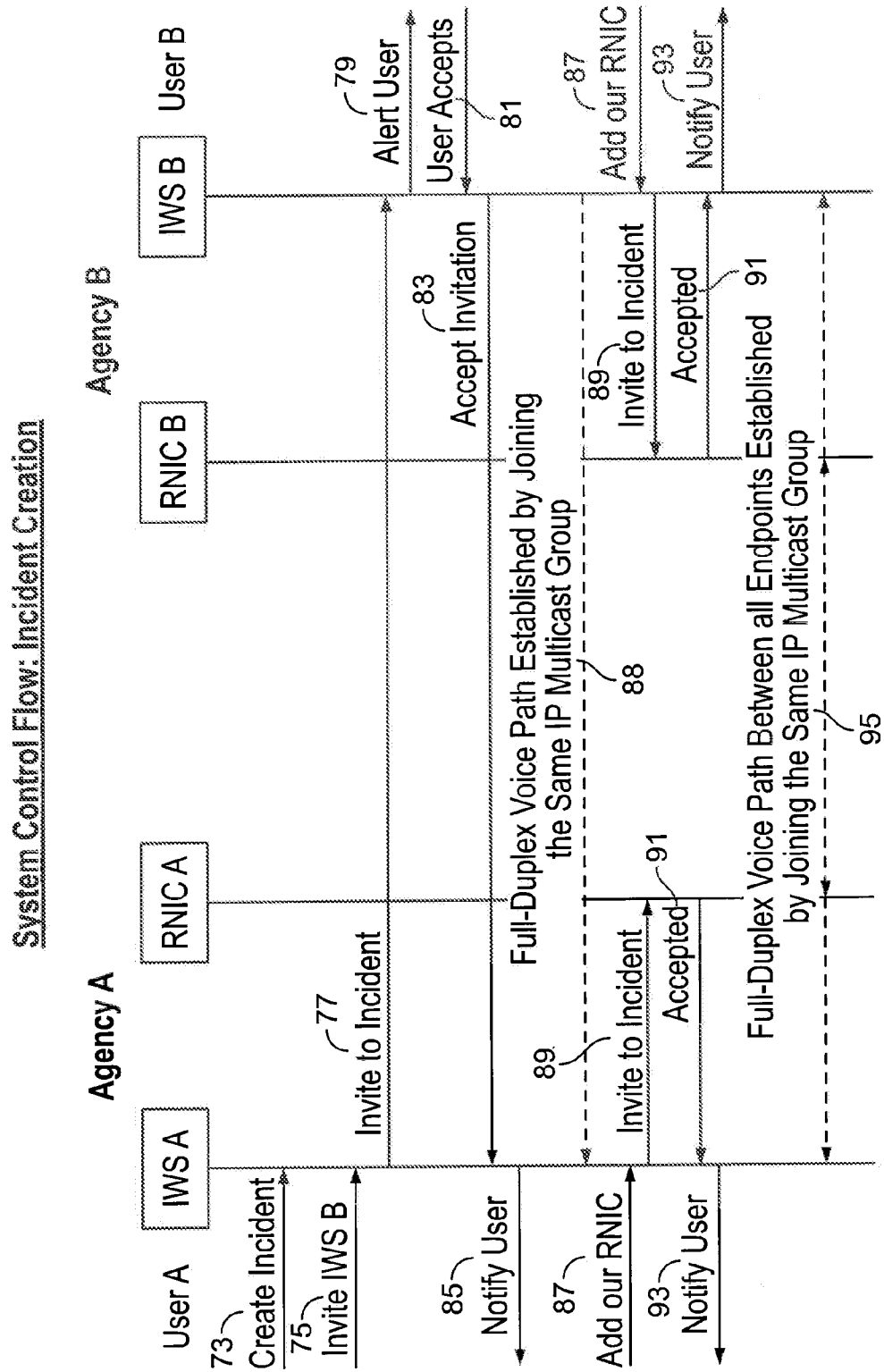
FIG. 5 is an event flow diagram showing the creation of an incident in accordance with the present invention interoperable communications network.
Figure 6:
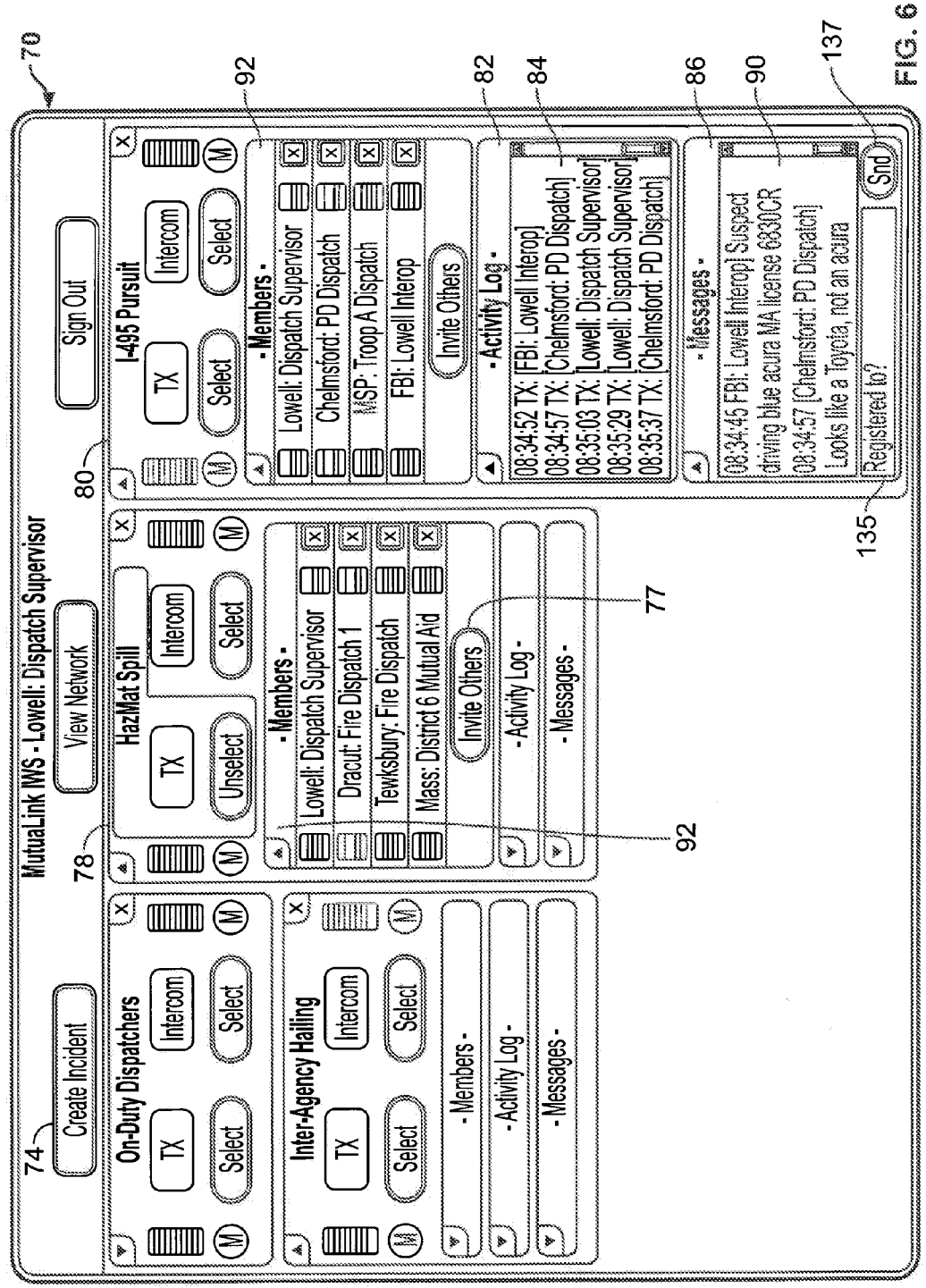
FIG. 6 is a diagram showing one embodiment of a graphical user interface (GUI) for use with an IWS of the present invention.
Figure 7:
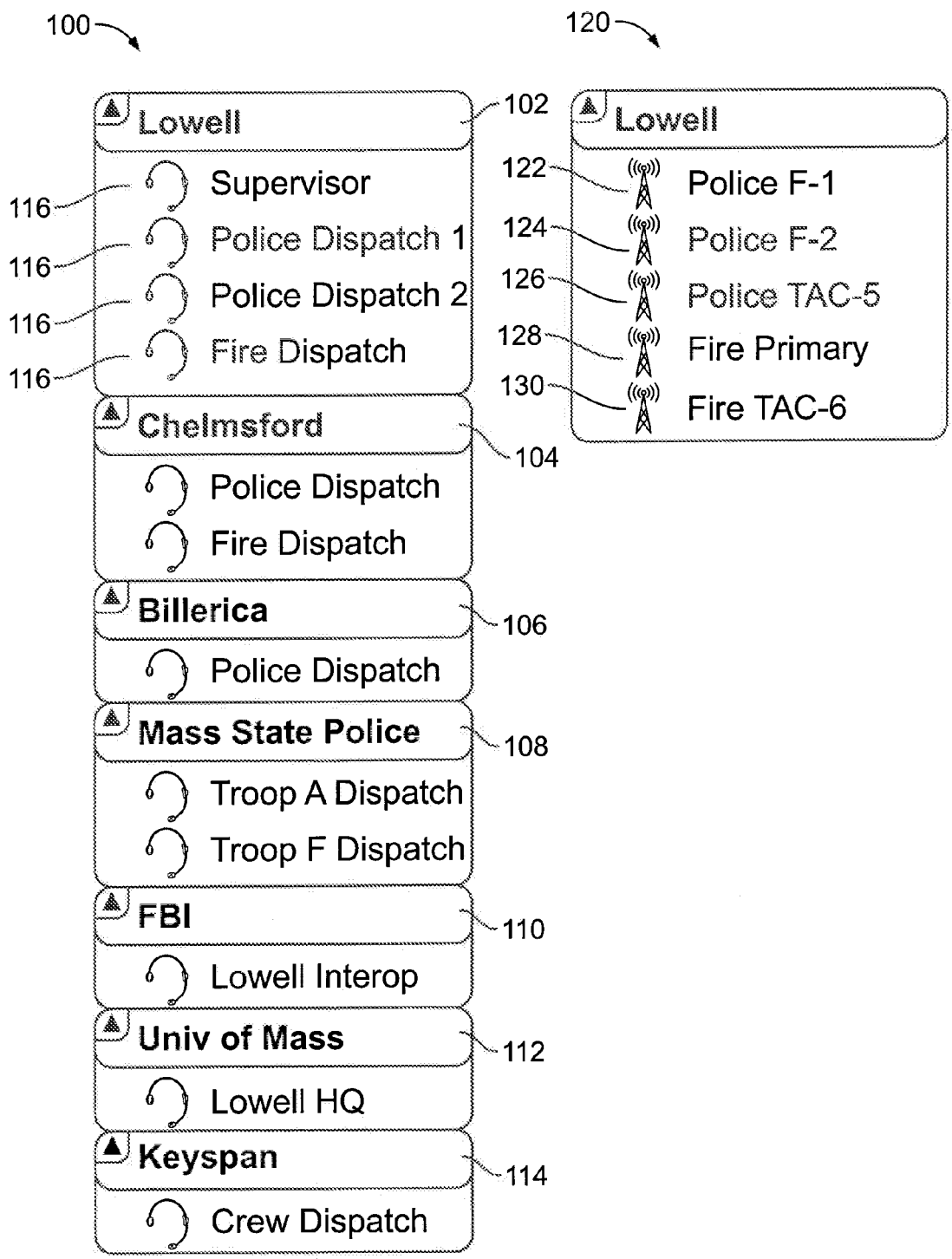
FIG. 7 is a diagram showing one embodiment of a GUI in accordance with the present invention for use with an IWS controller for contacting various other IWS controllers and networks within the system.

In operation, the IWS controller 22 creates an incident as set forth in the event flow diagram 70 of FIG. 5 and described following. An operator, User A, via an IWS controller 22 (IWS A) initiates a new incident 72 (FIG. 5, step 73) using the create incident button 74 of the GUI 76. (GUI 76 is illustrated in FIG. 6). The incident controller 45 assigns an IP address that will be used for voice communications for the incident 72 (the preferred embodiment uses an IP multicast address). If User A desires to talk to another IWS controller 22 (IWS B), he uses the GUI 76 via invitation button 77 associated with the incident 72 to select a particular IWS controller 22 to invite to participate in the incident 72 (FIG. 5, step 75). A GUI 100 (FIG. 7) is utilized by an IWS controller 22 for selection of another IWS controller to invite to an incident 72 or peer-to-peer talk group. In the FIG. 7 embodiment, each agency having IWS controllers 22 available on the Interop System 10 is identified on the GUI 100 (i.e., Lowell—102; Chelmsford—104; Billerica—106; Massachusetts State Police—108; FBI—110; University of Massachusetts—112; Keyspan—114.) The user of an IWS controller can select one or more IWS controllers 22 using the icons 116 identifying each IWS controller available. In this example, selecting the IWS B causes the incident controller 45 to look up and retrieve the address of IWS B in the endpoint registry 64. The incident controller 45 then sends an invitation to the particular IWS controller 22 selected using the Interop Network 13 (FIG. 5, step 77).

The incident controller on IWS B receives the invitation and provides a notification to the User B as to the invitation (FIG. 5, step 79). The User B may then accept or decline the invitation. Per the FIG. 5 example, User B accepts the invitation at step 81. Upon User B acceptance of the invitation, the incident controller 45 (of IWS B) sends an acceptance message to IWS A (FIG. 5, step 83) and the user thereof (User A) is alerted of the acceptance of User B at step 85.

Thereafter, the incident controllers 45 of both IWS A and IWS B direct their respective audio processors 60 to start a bidirectional audio stream as follows: Audio input from the IWS microphone 52 is converted to data packets (the preferred embodiment uses standard RTP or SRTP as appropriate) and is transmitted to the IP address assigned to the incident. This transmission may optionally be enabled by pressing a PTT (Push-To-Talk) button and disabled by the release of this button. Data packets received on the assigned IP address are converted to audio and sent to the IWS speakers 52. Thus, User A and User B are now engaged in a full-duplex voice conversation via their respective IWS controllers 22 (FIG. 5, event 88).

A preferred embodiment of the Interop System 10 uses the standard SIP protocol with message encryption to transmit messages over the Interop Network 13. However, the routing of information/data over the Interop Network 13 can be via any suitable protocol thus, the scope of the Interop System is not limited with respect to a particular data transmission protocol.

Still Referring to FIG. 5, following acceptance of an invitation to allocate its radio network 12 and associated communications devices 14, each IWS controller 22 must issue appropriate commands to the RNIC 20 coupled to the designated radio network to connect the same to the Interop Network 13. Thus, each IWS user (FIG. 5, User A and User B) intends to allocate an RNIC 20 under their control (e.g. RNIC A and RNIC B respectively) to participate in the incident. The operator of each IWS controller 22 then uses a GUI such as the GUI 120, shown in FIG. 7, to select an RNIC 20 (and associated radio network 12) allocated for the incident and for which the IWS controller 22 is authorized to control (FIG. 5, step 87). For example, the GUI 120 for Lowell (Lowell, Mass.) identifies an RNIC 20 for each of a Police F1—122; Police F2—124; Police TAC-5—126; Fire Primary—128; and Fire TAC-6—130. As indicated in the FIG. 7 example, the Lowell GUI 120 indicates only RNICs 20 for which the IWS controller 22 is authorized to control. Thus, the RNICs associated with other agencies do not appear on the GUI 120 of the IWS controllers 22 associated with the Lowell agencies.

As set forth above, each incident 72 created includes a separate IP address designated for that incident. Thus, if multiple incidents occur simultaneously wherein the same organizations are invited to couple their resources to the Interop Network 13, the audio transmissions are communicated to the radio networks 12 via the separate IP addresses for each incident 72. Accordingly the endpoint group for one incident 72 may include some common resources such as the IWS controllers 22 as well as various different or common RNICs 20 and associated radio networks 12.

As further shown in FIG. 5, the incident controller 45 for each IWS controller 22 then looks up and retrieves the IP address of the RNIC 20 to be coupled to the Interop Network 13 in the endpoint registry 64. The IWS controller 22 and/or incident controller 45 (FIG. 5, IWS A and IWS B) then sends an invitation to the retrieved address of the RNIC 20 using the Interop Network 13. (FIG. 5, step 89). As set forth above, the preferred embodiment uses the standard SIP protocol with message encryption. The incident controller 45 on the designated RNIC 20 receives the invitation and verifies (via the public keys stored in the configuration database 66) that the invitation is from an IWS controller 22 that has permission to control that RNIC. If verified, the RNIC 20 accepts the invitation, which causes the incident controller to send an acceptance message to the inviting IWS controller. (FIG. 5, step 91). The user of the IWS controller is notified of the acceptance by the RNIC 20 at step 93.

To complete the coupling of the allocated radio network 12 to the Interop Network 13, the incident controller 45 on the RNIC 20 directs the audio processor 60 to start a bidirectional audio stream as follows: Audio input from the connected resource (i.e., radio network 12) is converted to data packets (the preferred embodiment uses standard RTP or SRTP as appropriate) and is transmitted to the FP address assigned to the incident 72. This transmission may optionally be gated by either an "audio present" control signal from the resource, or by the audio processor 60 detecting that a sufficient audio signal is present. Data packets received on the assigned IP address are converted to audio and sent to the connected resource i.e., radio network 12 and thereby the associated communication devices 14). While such audio is being sent, the RNIC 20 will output an "audio present" control signal for use by the radio network 12. Still referring to the FIG. 5 example, all four endpoints (IWS A, IWS B, RNIC A, RNIC B) are thereby engaged in a full-duplex voice conversation which is established by joining the same in an IP multicast group (FIG. 5, event 95). Thus, any audio sent by one of the endpoints is received by all of the other endpoints.

Referring again to FIG. 6, the GUI 70 displays an activity log 82 including displaying a chronological listing 84 of the communications of each communications device 14 coupled to the incident 72. Additionally, a message window 86 on GUI 70 displays text messages conveyed between IWS controllers 22 associated with an incident 72. The message window 86 implements a text-messaging (or instant messaging) capability between the IWS controllers 22 participating in an incident 72. Operators of the IWS controllers 22 enter a message in the bottom window 135 then click the send button 137; The message is then sent to all other IWS controllers 22 which are currently members of the incident 72 and appears in the message window 86 of each of these IWS controllers. As shown in FIG. 6, identification headings as to the source of the messages are appended to the displayed listing 84 and the transcriptions 90 to identify the source of the transmission. This is one example of how the Interop System 10 provides more than just voice interoperability between discrete systems.

Still referring to FIG. 6, the GUI 70 also includes a member listing 92 for each incident 72 that identifies each organization or radio network 12 which have authorized coupling its associated radio network to the Interop Network 13 for the particular incident. Thus, the IWS controller 22 has a visual display showing all organizations and associated radio networks 12 coupled to the Interop Network 13 for each incident.

At any time during or following the completion of an incident 72, an IWS controller 22 via a user thereof may terminate the coupling between an associated radio network 12 for which the IWS controller is authorized to control and the Interop Network 13.

Accordingly, each IWS controller 22 communicates with other IWS controllers and RNIC 20 servers as peer-to-peer nodes in the Interop Network 13. Additionally, each RNIC 20 operates in response to commands from an authorized IWS controller. Incident communications are transmitted to all IWS controllers 22 and RNIC 20 servers coupled to an incident 72 using peer-to-peer multicast transmissions. Accordingly, each RNIC 20 and associated radio network 12 is coupled to the Interop Network 13 pursuant to commands from an authorized IWS controller 22. Thus, control of each radio network 12 is maintained by an IWS controller 22 associated therewith.

Although, the above-identified embodiment of the invention illustrates a system and method for coupling a plurality of radio networks 12 to the Interop Network 13, the present invention is not limited in this regard as other types of communications systems and networks can also be coupled to an Interop Network 13 in accordance with the present invention. For example, a public address system (e.g., the public address system in a high school or college campus) can be coupled to the Interop Network 13 via an RNIC 20 server and appropriate interface such that agencies such as police or fire organizations can directly operate and communicate over the public address system via the Interop Network 13. Thus, any type of discrete communications system can be coupled to the Interop System in accordance with the present invention via an RNIC 20 and appropriate interface.

Further, it is not required that the RNIC 20 and IWS controller 22 reside on separate servers, thus the Interop system 10 disclosed can be integrated directly into dispatch consoles present in an existing system. Alternatively, the interop system disclosed can be integrated directly into a computer-aided dispatch (CAD) system.

Additionally, the Interop system of the present invention can be used to permit discrete organizations, and the computer networks associated therewith, to be accessible to otherwise disjunct agencies or networks. For example, the present invention Interop System 10 can be utilized to provide police unit field units access to data facilities residing on a database coupled to an otherwise disjunct network, such as a crime database or floor plan of a building. Thus, the disclosed system can be used to selectively grant access to data sources, such as a database.

Another example of resources which are connectable to an Interop System of the present invention are video systems including video cameras, such as surveillance or in-vehicle cameras wherein access to the video data captured thereby is selectively provided to other users of the Interop system.

As set forth above, many other types of communications devices can be coupled to an Interop System in accordance with the present invention wherein selective access to certain resources is provided to other organizations and users thereof coupled to the system. Access is granted and controlled only by authorized controllers associated with the resources.

Further, a pre-planned ("storm plan") can be developed to facilitate rapid setup of an incident configuration in accordance with the present invention system. Also, the disclosed system can provide communications among a defined subset of members (such as certain IWS controllers only, permitting dispatchers to "conference" off-the-air with respect to an incident group).

Figure 8:
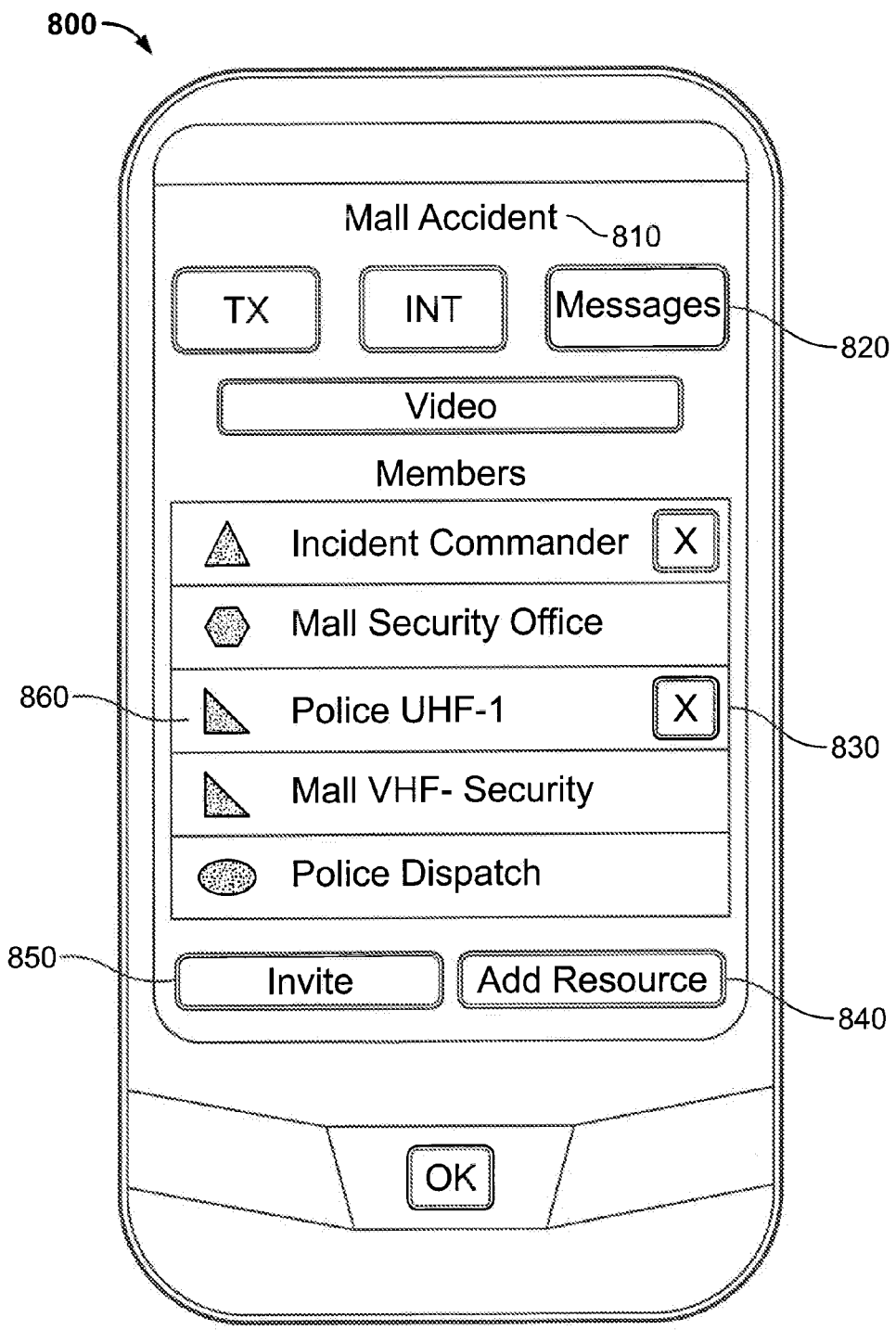
FIG. 8 is a diagram of a smartphone IWS agent, according to an embodiment of the invention.

In a further embodiment, a handheld mobile wireless device, such as a smartphone, can serve as an IWS. FIG. 8 provides a smartphone IWS 800, according to an embodiment of the invention. Smartphone IWS 800 is not limited to smartphones, but includes all types of mobile wireless devices, such as smartphones and other advanced cellular mobile telephones. In FIG. 8, smartphone IWS 800 displays an incident screen, where a user can view and affect the members of an incident, such as member list 830, which includes a number of example members, such as Police UHF-1 member 860. Icon 810 identifies the name of the incident. Buttons 820 provide touch-sensitive buttons that provide a push-to-talk interface (TX), send and receive text messages (messages), provide Intercom functions (INT), and send or transmit video streams (videos). The display also includes an invite 850 button that is used to invite new members to an incident, and add resource button 840 that is used to add additional resources to the incident.

In addition to the incident screen, there are three primary screens displayed by smartphone IWS 800. These screens include a welcome screen, an incident list screen and an event list screen. The welcome screen is where a configuration and a connection is established to a smartphone IWS gateway, such as smartphone IWS gateway 1010. The incident list screen provides a list of incidents known to the smartphone IWS. The event list screen is where events on incidents not being viewed are accumulated for later action by a user.

Figure 9:
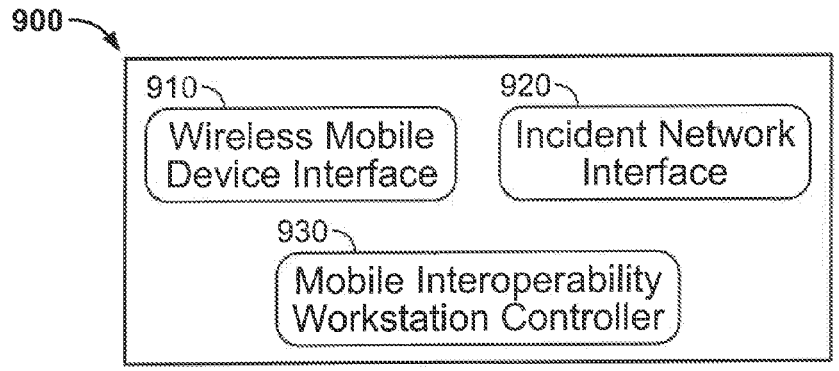
FIG. 9 is a block diagram of smartphone IWS agent, according to an embodiment of the invention.

Smartphone IWS 800 includes a Smartphone IWS agent 900, illustrated in FIG. 9, according to an embodiment of the invention that operates within a smartphone or other handheld wireless device. Smartphone IWS agent 900 includes wireless device interface 910, incident communications network interface 920 and mobile IWS controller module 930. Smartphone IWS agent 900 may be implemented in software, hardware, firmware or a combination thereof Similarly, each of wireless device interface 910, incident communications network interface 920 and mobile IWS controller module 930 may be implemented in software, hardware, firmware or a combination thereof.

Figure 10:
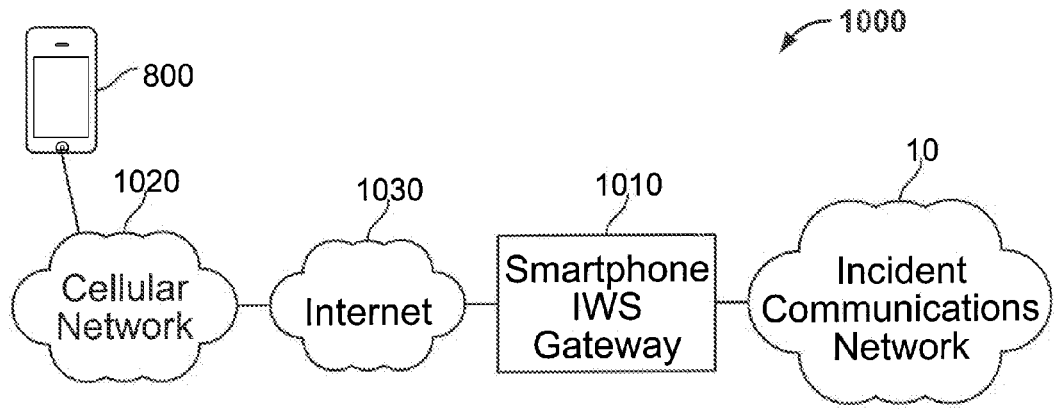
FIG. 10 is a network diagram of a smartphone IWS and a smartphone IWS gateway used within a cellular network, according to an embodiment of the invention.
Figure 11:
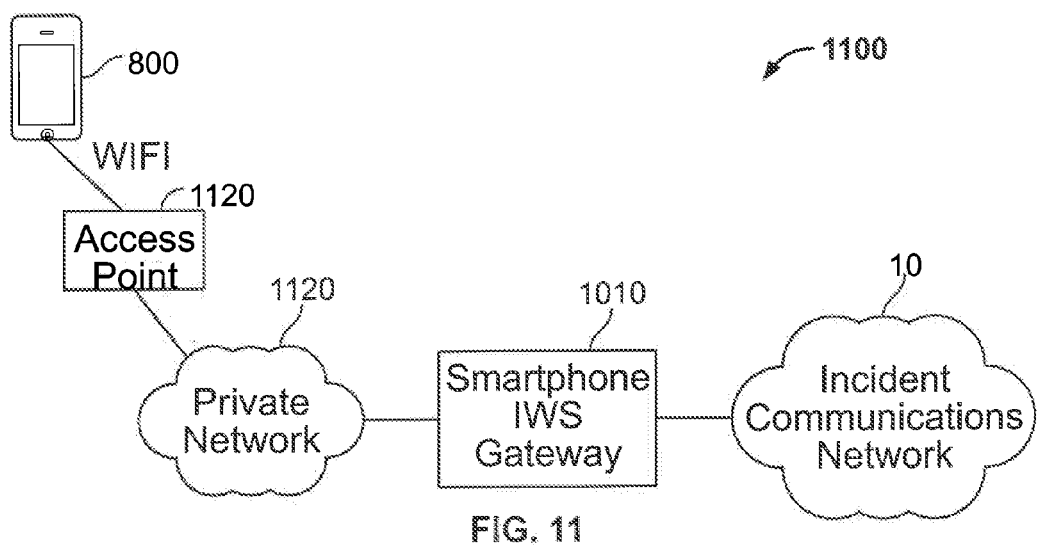
FIG. 11 is a network diagram of a smartphone IWS and a smartphone IWS gateway used within a WiFi network, according to an embodiment of the invention.

FIGS. 10 and 11 provide network configurations for use of Smartphone IWS 800 that highlight the use of a smartphone IWS gateway, according to embodiments of the invention. FIG. 10 illustrates the scenario when Smartphone IWS is connected to incident communications network 10 through a cellular network, such as cellular network 1020. In this case, Smartphone IWS 800 establishes a cellular connection to cellular network 1020, which in turn is coupled to Internet 1030. Smartphone IWS 800 is coupled through cellular network 1020 and Internet 1030 to Smartphone IWS Gateway 1010. Smartphone IWS Gateway 1010 is coupled to Interop System 10, representative of an incident communications network. As in the case of smartphone IWS agent 900, smartphone IWS gateway 1010 may be implemented in software, hardware, firmware or a combination thereof.

The functionality to provide full IWS capabilities and interact with members of an incident communications network, such as interop system 10 requires significant memory and computing resources. Because memory and computing resources are relatively limited on a smartphone, the IWS functionalities are split between the Smartphone IWS Agent 900 and Smartphone IWS Gateway 1010.

As will be explained more fully below, Smartphone IWS Gateway 1010 includes the bulk to the functionality to interface with an incident communications network and other members within the incident communications network, while Smartphone IWS agent 900 includes certain functionality to interface with an incident communications network, as well as media presentation modules and incident member management capabilities. Additionally, Smartphone IWS gateway 1010 includes the functionality to receive device capability information, e.g., video, audio, texting capabilities, processor speed, connection bandwidth from a particular smartphone IWS and to adapt the nature of messages and functions requested of the Smartphone IWS. Smartphone IWS gateway 1010 also adapts to the capabilities of the wireless mobile device in that based on the connection speed, processor speed and audio/visual capabilities Smartphone IWS gateway 1010 will push more or less functionality to the wireless mobile device dynamically upon the wireless mobile device connecting to Smartphone IWS gateway 1010.

FIG. 11 illustrates the scenario when Smartphone IWS 800 is connected to

Incident Communications Network 10 through a WiFi connection. In this case, Smartphone IWS 800 connects to access point 1120 through a WiFi connection to be connected to private network 1120. Private network 1120 is coupled to Smartpohone IWS Gateway 1010. Smartphone IWS 800 is coupled through Private Network 1120 and to Smartphone IWS Gateway 1010. Smartphone IWS Gateway 1010 is coupled to Interop System 10, representative of an incident communications network.

Smartphone IWS 800 creates and manages incidents, including the ability to invite other agencies and add resources. Smartphone IWS 800 participates in incidents using push-to-talk speech on radio and intercom conduits and by sending and receiving text messages. Smartphone IWS 800 allows a user in the field to view a video stream associated with an incident. A user will also be able to stream video using Smartphone IWS 800's camera to the other participants in the incident.

In an embodiment, Smartphone IWS 800 uses the Google Android platform using the T-Mobile (HTC) G1 or similar device. The Smartphone IWS 800 may use other wireless device operating systems and wireless handheld devices. A user may use the speakerphone or headset modes of Smartphone IWS 800 for voice functionality. This allows the user to continue to use the touchscreen for control operations. The Smartphone IWS 800 agent allows for the use of an on-screen keyboard when closed and the physical keyboard when open. The Smartphone IWS 800 agent adapts to changes in screen aspect ratio.

A welcome screen is presented when the Smartphone IWS 800 agent is initially launched, has been disconnected from a smartphone IWS gateway, such as smartphone IWS gateway 1010, or has been disconnected from a smartphone IWS gateway due to a network error or timeout. From the welcome screen, the user may configure access to a gateway, such as smartphone IWS gateway 1010, connect to the gateway, or return to a home screen.

When Smartphone IWS agent 900 receives a configure request from a user, the Smartphone IWS 800 will prompt for configuration information related to a server address and security parameters. In an embodiment, user name and password validation are required. The information is saved in the device's memory for use in future invocations of the program.

A user may choose to operate Smartphone IWS 800 without audio and video sharing. In this case, only incident control and text messaging operations will be available. This option is provided for cases where the mobile data network provides limited bandwidth. In embodiments, the Smartphone IWS agent 900 autodetects limited bandwidth and prompts the user to disable audio and or video sharing to conserve bandwidth.

Smartphone IWS agent 900 prompts a user to select the IP address to be used for initiating sessions from Smartphone IWS 800. This option is necessary as the smartphone may simultaneously be able to use multiple networks, such as a WiFi and a 3G network.

The Smartphone IWS 800 agent also enables selection of "Voice packetization interval" to provide control of the frequency of generation of RTP packets containing the user's speech. Smaller packetization intervals typically provide lower latency and less noticeable dropouts in speech, but at the cost of transmission efficiency and processing overhead. 20 ms is the typical value for VoIP applications and in an embodiment represents the default value, if system performance allows.

When a connection request is received from a user, the Smartphone IWS 800 will establish a connection to a gateway, such as smartphone IWS gateway 1010. If the connection process is successful, control passes to the Incident List screen described below. The Incident List screen displays the list of incidents known to the Smartphone IWS 800. If not successful, an error message will be displayed.

The connection to the gateway server, such as smartphone IWS gateway 1010, will occur over a secured or non-secured TCP connection over a 3G wireless or Wi-Fi network. Upon establishing the connection, Smartphone IWS 800 begins a dialog with a Connect message to the gateway server, such as smartphone IWS gateway 1010. The network manager server answers with an authentication challenge using a Challenge message. This message contains a text string. Smartphone IWS 800 responds to the challenge with a ChallengeResponse message containing the MD5 hash of a predefined string unique to the user. Alternatively, other types of encryption can be used. If the server accepted the ChallengeResponse, it will transmit a RegisteredExtApp message. Otherwise, it will transmit a new challenge. After a set number of failed challenge exchanges, the network manager server will terminate the socket connection.

The RegisteredExtApp message contains important data for Smartphone IWS 800. It contains the URI and name used by the Smartphone IWS 800 on the incident communications network. This system name will appear as a title bar in the incident list window.

Smartphone IWS 800 uses conduits within incidents to the global level for the connection between the Smartphone IWS 800 agent and the gateway, such as smartphone IWS gateway 1010 to support the audio and video paths, and other needs.

Upon connection, the gateway server will use configuration and connection information to determine the appropriate implementation of conduits. For each such conduit, the server will send a message to create the conduit. The Smartphone IWS 800 creates and maintains the described global conduits for the remainder of the connected session.

An audio conduit named "audio" is used, for example. The smartphone IWS gateway provides either a SIP URI for negotiation of a 2-way voice-over-IP connection or a standard telephone number to be called. For the VoIP case, it is preferable to use TCP for the connection to the SIP server due to the complexities of directing UDP packets through NAT servers and firewalls.

A video conduit named "video" may also be created. Since smartphone IWS 800 (and its network connection) may only be capable of a single video stream, this conduit will be negotiated to support all incidents. As with the audio conduit, the gateway server will provide a SIP URI. Through the session initialization the video capabilities—codec (H.264), bit rate, frame rate, and image size—will be negotiated.

Smartphone IWS 800 is now connected to the gateway server, such as smartphone IWS gateway 1010. It has no information about any incidents or endpoints currently managed by an interop system, such as interop system 10. Incident and endpoint information is received asynchronously and continuously from smartphone IWS gateway 1010 within an incident communications network.

After the connection between Smartphone IWS 800 and the gateway server is established, a request to join an incident can arrive at any time while viewing any screen. These requests are urgent and will trigger a modal dialog box over the current display. A ringing sound is played to alert the user to the incoming invitation.

The invitation is indicated by the transmission of a message by the gateway server to Smartphone IWS 800. The user's selection triggers the transmission of an accept or reject message to the gateway server.

No user action is required to listen to the radio and intercom conduits of any incident in which Smartphone IWS 800 is a participant. The smartphone IWS gateway 1010 presents an RTP stream to Smartphone IWS 800 per the specification of the global audio conduit. The Smartphone IWS 800 simply outputs this stream to the speakerphone or headset.

The Incident List screen is a critical component of the Smartphone IWS 800. The Incident List screen shows two classes of incidents: (1) those in which the Smartphone IWS 800 is a member, and (2) those in which it is not. In an embodiment, incidents are presented in a specific order. Incidents in which the Smartphone IWS 800 is a member are shown alphabetically. Incidents in which Smartphone IWS 800 is not a member are then shown alphabetically.

From the Incident List screen the user can choose an incident to view. Pointing to select any incident directs the application to the Incident screen for that incident. When the user requests to add an incident, the Smartphone IWS 800 agent provides an interface to create a new incident. At the Incident List screen the user can create and manage lists of favorite endpoints to simplify the process of inviting new endpoints to an incident. The user can termininate the Smartphone IWS 800 connection by simply hitting a disconnect icon.

A user can create a new incident by using the Smartphone IWS 800. The user is presented a modal dialog box containing a text area to enter the incident name, a checkbox to enable this incident for secured communication. When creating a new incident, Smartphone IWS 800 sends a message to smartphone IWS gateway 1010, and control returns to the Incident List screen. Smartphone IWS gateway 1010 will respond asynchronously, acknowledging the creation of the incident, its conduits, and its current list of members.

In a real deployment, an gateway server may have access to dozens of agencies with hundreds of endpoints and workstations. Typically, most users will use a relatively small number of those options in their typical patterns. To address that need, the Smartphone IWS agent 900 provides an interface to create and delete lists of endpoints and to add and remove endpoints from each list.

Each list will be maintained in non-volatile memory so it remains available for future invocations of the Smartphone IWS agent 900. While the user can only add endpoints that are currently known to the agent through the receipt of messages, the list may include the names of endpoints that are not currently available.

The Smartphone IWS 800 receives streamed audio from all member incidents regardless of the displayed screen. If the user is viewing the incident list, the Smartphone IWS 800 will correlate an incoming conduit status message to the incident responsible for the audio stream. While the incident participant cannot be displayed at this level, the Smartphone IWS 800 can show which incident is providing the speech.

The Incident screen, as depicted in FIG. 8, allows the Smartphone IWS 800 to participate fully in any incident. Through this interface the user can participate in the incident using push-to-talk voice and text messages, manage resources within the incident, invite other agencies to participate, watch video streamed from another endpoint, and stream video to the incident.

The user may view any incident, but only in an incident in which he is a member does he have full capability. In a non-member incident, the user can only invite himself (if the incident is not secured) or move/remove controllable endpoints.

Within the Incident screen there is a member list view and a message view. In the member list view the user can see and control the participants in an incident. In the message view, the user can send and receive text messages to other IWS participants in the incident through the incident's control channels. The user toggles between these modes.

The user participates in an incident by pressing and holding the TX or Intercom button on the incident display. The TX button corresponds to the incident's radio conduit. The Intercom button corresponds to the incident's intercom conduit. When requested by a user, the Smartphone IWS 800 sends a conduit status message for the appropriate incident and conduit to smartphone IWS gateway 1010 indicating that the transmit function is on. When the function is released, a conduit message to turn off the feature is sent. While the transmit function for the conduit is enabled, the smartphone IWS gateway 1010 propagates the RTP stream generated by the Smartphone IWS 800 to the other participants in the incident.

The Smartphone IWS agent 900 uses the RTP streaming capabilities of the platform to generate a voice stream to smartphone IWS gateway 1010 at all times. Voice activity detection may be enabled on the Smartphone IWS 800 to save bandwidth. However, a gateway server will not deliver this voice stream to any conduit unless transmission has been activated.

When the incoming speech path can be correlated to the currently viewed incident, the identity of the speaker and the conduit on which he is speaking will be indicated. For example, an indication can be provided by changing the background color of the transmitting member displayed on a screen of the wireless mobile device.

Pressing an Invite button on the Incident screen opens an overlay window. In this overlay window, the user can still use the push-to-talk functions, but the list of incident members is replaced with a list of resources that may be invited to the incident.

Assuming that the user confirms each of the invitations, Smartphone IWS 800 will send an invite message for each endpoint. If the incident is a secured incident, any participant added to the incident must be capable of secured communication. Any selection of unsecured participants will result in no action. The secured status of participants can be shown with a lock icon on the participant's label. Unsecured endpoints should remain in the list because the user is more likely to believe that a missing endpoint is down, not improperly configured.

Inviting each participant to an incident results in transmission of an invite message by the Smartphone IWS 800. Once the invitation is accepted or declined, additional messages will update Smartphone IWS 800's model of members and status.

Adding a telephone network interface as an incident member requires the user to specify a phone number to call. The Smartphone IWS 800 presents a prompt for this information. This prompt integrates with the device's address book to allow selection by name. Either a telephone number or a SIP URI must be accepted as input in this case.

Adding a multichannel NIC, such as a radio interface, requires additional messaging. The message sequence occurs after an invite message is sent by Smartphone IWS 800. Smartphone IWS gateway 1010 reports the available channels to Smartphone IWS 800. The Smartphone IWS 800 will prompt the user for a selection and transmit a corresponding message.

Additionally, in an embodiment of the invention pre-established lists of potential members are created and stored within Smartphone IWS 800, Smartphone IWS gateway 1010 or other network device within an incident communications network. The lists may be created based on the type of incident. For example, a fire incident may include a certain list of potential members, while a traffic accident incident may include a different list of potential members. The lists may further be organized based on geographical proximity of members, device capabilities of members, skills of members, etc.

When a certain type of incident arises, for example a fire incident, Smartphone IWS 800 automatically sends invites to all potential members in the fire incident list. Additionally, or in the alternative an email, SMS, cellular telephone call can be auto generated to alert the potential members of an incident requiring their support. In an electronic transmission, such as an SMS or email message, in an embodiment, the message may include a hypertext link that when clicked by the potential member automatically begins the connection process to the incident communications network.

In an alternative embodiment, in which only an invite is initially sent if a potential member does not accept the invitation, an alternative message or multiple messages can be sent to the potential member via SMS, email or telephone alerting the member to the incident. In an embodiment, whether an alternate messages is sent and the number of retries that occur is a function of the priority of the incident and/or relative importance of the potential member.

An endpoint that has the "video" capability can stream video to the participants in an incident. When expanded, these endpoints will include a button to "Play" the video stream. After a sequence of steps described below, the Smartphone IWS 800 will receive a stream containing RTP-encapsulated video and display it to the user. Upon a user's request to stop the video, a further sequence of messages stops the streaming. If the endpoint is removed from the incident (or the Smartphone IWS 800 leaves the incident), the RTP stream opened for this video stream is closed In an embodiment, while viewing video the push-to-talk functionality remains active. When an endpoint with video capability is added to the incident, the gateway server sends a message to create a conduit for video streaming to the Smartphone IWS 800. If the Smartphone IWS 800 has negotiated a global video conduit, it may proceed to enable reception of this video stream. To enable video transfer, Smartphone IWS 800 transmits a message for this conduit that initiates video transmissions. After some processing delay, smartphone IWS gateway 1010 will send the video stream over the negotiated RTP stream.

If Smartphone IWS 800 is determined to have video transmission capability, the global video conduit can also be used to transmit video to the incident. When expanded, the Smartphone IWS 800's incident member will include a button to "Stream" video to the incident. Upon pressing this button, a sequence of messages enables the Smartphone IWS 800 to capture live video and transmit it through the RTP stream. The user may stop this transmission at any time. In an embodiment, while streaming video the push-to-talk functionality remains active.

The video streaming and management capabilities within Smartphone IWS agent 900 provide significant enhancements for monitoring and managing incidents. Namely, the ability of Smartphone IWS agent 900 to support simultaneous video streaming with voice collaboration aids in the management of incidents. Additionally, the peer-to-peer sharing of video with no centralized server provides significant flexibility. Smartphone IWS agent 900 and more specifically mobile interoperability workstation controller 930 enables video streaming to be annotated with location information gathered from GPS information when available through a smartphone, and with time information. Additionally, video streams can be preserved either on a smartphone IWS, smartphone gateway or other network database coupled with an incident communications network. The video streams may include tags that link specific times within the video stream to message logs, event logs, members participating at the time of the video stream and other factors.

Additionally, in an embodiment a smartphone gateway, smartphone IWS, or other device within an incident communications network can direct smartphone IWSs and other mobile and fixed video capture devices to redirect the video capture device's field of view based on the location information provided with individual video streams or other factors to gain an improved visual perspective on an incident or event.

Moreover, when an incident is occurring a smartphone IWS or other IWS can send an invite message to other video enabled devices to join the incident to provide further perspectives or views. In an embodiment, a list of potential members with video capabilities and their location is maintained either within a smartphone IWS or a smartphone IWS gateway, such that at any given time a smartphone IWS, or other IWS can assess what members should be invited to assist with an incident based on their location and capabilities.

As alluded to above, Smartphone IWS agent 900 maintains a log of the recent events that have occurred for each incident. These events include, but are not limited to, the incident's definition, addition or removal of members and conduits, start and end of voice transmission, and sending and receiving of text messages. Any of these events can be indexed with a video or audio stream.

Text messages and conduit flow status may be received for incidents at any time. Since the user may be busy in an incident of his selection, a discreet and non-interrupting means of indicating outstanding incident status flows is provided. In an embodiment, on the Android platform, an icon on the event bar provides this discreet notification. The user can drag down on the icon to show the Android notifications window.

Each Smartphone IWS 800 event will appear on this list. One event will appear for each incident and for each type of event—message received, audio received on radio conduit, and audio received on intercom conduit. Because the newest event will appear at the top of the list, a new event refreshes a previously received event and would move it to the top of the list.

Smartphone IWS 800 employs an adapted XML protocol for connection of Smartphone IWS 800 to smartphone IWS gateway 1010. The protocol is based on XML instead of a minimally formatted text. Although XML requires additional parsing, the richness of the XML schema defined allows more flexibility in the exchange of data and ability to enable the new features.

The protocol is based on a modified XML format tailored to the unique needs of an incident communications network environment. The form of the message are:

```
<Message [version="1.0"]>
    <MessageType>
        <MessageParameter1>param-value1</MessageParameter1>
        <MessageParameter2>param-value2</MessageParameter2>
        ...
    </MessageType>
</Message>
```

The optional version attribute in the opening block of the message is provided to future-proof both the server and agent in the event of protocol changes.

For efficiency, a header is used to delineate XML messages. Messages will be written to the socket as:

```
MLAPI/1.0
Content-Length: 146
<Message>
    <CreateIncidentNet>
        <Name>Jackknifed+Truck</Name>
        <Secured>true</Secured>
    </CreateIncidentNet>
</Message>
```

The content length begins with the first character after the 2 CR-LF (ASCII 0x0D-0xA) sequences after the Content-Length field. During parsing CR-LF will be mapped to LF, and any CR without LF will be mapped to LF. Any CR-LF or LF is strictly optional and simply for the ease of debugging. The content-length header must properly account for all bytes of the message. The XML receiver includes the ability to recover from a loss of synchronization.

The protocol supports a transition from uniform resource identifier (URI) to globally-unique identifier (GUID) for endpoint and other objects. The GUID is more efficient for parsing and searching operations.

The foregoing description of embodiments of the invention has been presented for the purpose of illustration and description, it is not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated. The boundaries established within block diagrams of aspects of the invention were for illustration purposes for ease of presentation. These boundaries with respect to the specific location of features and capabilities can be adjusted or eliminated as will be known by one skilled in the art upon review of the description of the present invention. It is intended that the scope of the invention be defined by the claims appended hereto.

What is claimed is:

1. An agent to enable a wireless mobile device to operate as an interoperability workstation (IWS) controller within an incident communications network, comprising:
    a wireless mobile device interface that couples the agent to the wireless mobile device;
    an incident communications network interface that couples the agent to a smartphone IWS gateway; and
    a mobile interoperability workstation controller coupled with the wireless mobile device interface and the incident communications network interface that provides functionality to enable the wireless mobile device to operate as a mobile interoperability workstation, wherein IWS functionalities are shared between the agent and the smartphone IWS gateway, wherein the wireless mobile device retains pre-existing functionality.

2. The agent of claim 1, wherein the wireless mobile device interface adapts a series of graphical user interfaces to enable a user to control interoperability workstation functions to unique operating characteristics of the mobile device.

3. The agent of claim 1, wherein the mobile device interface determines capabilities of the wireless mobile device, wherein the incident communications network interface transmits the capabilities of the wireless mobile device to the smartphone IWS gateway.

4. The agent of claim 1, wherein the mobile device interface enables a selection of the type of wireless communications protocol to be used by the wireless mobile device.

5. The agent of claim 1, wherein the incident network interface initiates a secured connection of a wireless network between the wireless mobile device and the smartphone IWS gateway.

6. The agent of claim 1, wherein the incident network interface establishes one or more communications conduits to the incident communications network, wherein a conduit comprises a dedicated communications channel for audio, video, messaging or data communications between the wireless mobile device and the incident communications network.

7. The agent of claim 6, wherein the incident network interface upon creation of a video conduit will negotiate video capabilities comprising codec, bit rate, frame rate and image size as a function of one or more of the capabilities of the mobile wireless device, incident characteristics and capabilities of members within an incident communications network.

8. The agent of claim 1, wherein the incident network interface provides a prompt to a user upon a request to join an incident arriving at the wireless mobile device, wherein the prompt includes one or more of a modal dialog box and/or an audible alerting tone.

9. The agent of claim 1, wherein the incident network interface provides video streaming of video captured by the wireless mobile device to the incident communications network.

10. The agent of claim 9, wherein the video stream identifies the geographical location of the video, wherein the geographical location of the video stream is provided by capturing position information from GPS capabilities of the wireless mobile device.

11. The agent of claim 9, wherein the mobile interoperability workstation controller associates a video stream with meta data identifying one or more of location information, members present at the time of the video stream, tags to messages occurring simultaneously, and tags to events occurring simultaneously.

12. The smartphone gateway of claim 11, wherein the smartphone gateway stores a the video stream with the meta data.

13. The agent of claim 1, wherein the mobile interoperability workstation controller invites other members to participate in an incident based on the video capabilities and location of the member when additional views of an incident are desirable.

14. The agent of claim 1, wherein the incident network interface receives video streaming from the incident communications network and the video stream is displayed on the wireless mobile device.

15. The agent of claim 1, wherein the incident network interfaces uses an adapted XML protocol for communications between the wireless mobile device and a network manager server, wherein the form of a message is

```
<Message [version="1.0"]>
    <MessageType>
        <MessageParameter1>param-value1</MessageParameter1>
        <MessageParameter2>param-value2</MessageParameter2>
        <MessageParameter(n)n>param-value(n)</MessageParameter(n)>
    </MessageType>
</Message.>
```

16. The agent of claim 1, wherein the mobile interoperability workstation controller evaluates available bandwidth and implements bandwidth management features to dynamically adjust bandwidth use based on available bandwidth and as a function of a type and status of an incident.

17. The agent of claim 16, wherein bandwidth management features comprise suggesting bandwidth management alternatives or automatically adjusting bandwidth usage.

18. The agent of claim 1, wherein the mobile interoperability workstation controller presents an incident list screen adapted to the wireless device as a function of the screen characteristics and characteristics of an incident, wherein the incident list screen provides a listing of the incidents that are ongoing and a listing of the incidents for which the wireless mobile device is a member.

19. The agent of claim 1, wherein the mobile interoperability workstation controller maintains a preset list of potential members to incidents of varying types, wherein whether a potential member is included in a preset list is a function of one or more of the type of incident, the location of the member and/or the type of device of the member.

20. The agent of claim 19, wherein the mobile interoperability workstation controller automatically initiates sending invites to potential members of a preset list when an incident occurs.

21. The agent of claim 19, wherein the mobile interoperability workstation controller sends a email or SMS message to a potential member when the potential member does not respond to the invite, wherein the email or SMS message includes a hypertext link that when clicked initiates a process of having the potential member join the incident.

22. The agent of claim 1, wtherein the wireless mobile device is a smartphone.

* * * * *

UNITED STATES PATENT AND TRADEMARK OFFICE
CERTIFICATE OF CORRECTION

PATENT NO. : 8,364,153 B2
APPLICATION NO. : 12/856383
DATED : January 29, 2013
INVENTOR(S) : Boucher et al.

Page 1 of 1

It is certified that error appears in the above-identified patent and that said Letters Patent is hereby corrected as shown below:

In the Claims:

Column 18
Line 33, Claim 12, please replace "a the video" with --the video--.

Column 18
Line 47, Claim 15, please replace "interfaces" with --interface--.

Column 20
Line 6, Claim 21, please replace "a email" with --an email--.

Signed and Sealed this
Twenty-first Day of May, 2013

Teresa Stanek Rea
*Acting Director of the United States Patent and Trademark Office*